(12) United States Patent
Briant et al.

(10) Patent No.: US 11,011,861 B1
(45) Date of Patent: May 18, 2021

(54) STACKED RECEPTACLE CONNECTOR ASSEMBLY

(71) Applicant: TE CONNECTIVITY SERVICES GMBH, Schaffhausen (CH)

(72) Inventors: Eric David Briant, Dillsburg, PA (US); Christopher David Ritter, Hummelstown, PA (US); Linda Ellen Shields, Mechanicsburg, PA (US)

(73) Assignee: TE CONNECTIVITY SERVICES GmbH, Schaffhausen (CH)

( * ) Notice: Subject to any disclaimer, the term of this patent is extended or adjusted under 35 U.S.C. 154(b) by 25 days.

(21) Appl. No.: 16/663,614

(22) Filed: Oct. 25, 2019

(51) Int. Cl.
| | |
|---|---|
| *H01R 12/78* | (2011.01) |
| *H01R 12/71* | (2011.01) |
| *H04L 25/02* | (2006.01) |
| *H01R 12/72* | (2011.01) |
| *H01R 13/514* | (2006.01) |

(52) U.S. Cl.
CPC .......... *H01R 12/78* (2013.01); *H01R 12/716* (2013.01); *H01R 12/721* (2013.01); *H01R 13/514* (2013.01); *H04L 25/0298* (2013.01)

(58) Field of Classification Search
CPC ............... H01R 13/659; H01R 12/724; H01R 13/6587; H01R 12/721; H01R 13/6594; H01R 24/60; H01R 12/716; H01R 13/658; H01R 13/6582; H01R 13/6658; H01R 13/7172; H01R 13/7175; H01R 13/518; H01R 13/6275; H01R 13/6471; H01R 13/6581; H01R 13/6583; H01R 12/00; H01R 12/62

USPC ............... 439/541.5, 607.23, 607.25
See application file for complete search history.

(56) References Cited

U.S. PATENT DOCUMENTS

| | | | |
|---|---|---|---|
| 7,070,446 B2* | 7/2006 | Henry ................. | H05K 9/0058 439/541.5 |
| 7,421,184 B2* | 9/2008 | Long .................... | G02B 6/0001 385/146 |
| 7,575,471 B2* | 8/2009 | Long .................... | G02B 6/0001 439/541.5 |
| 7,764,504 B2* | 7/2010 | Phillips .............. | H01R 13/6582 361/715 |
| 7,845,975 B2* | 12/2010 | Cheng ................. | H01R 13/658 439/541.5 |
| 8,123,559 B2* | 2/2012 | Brown ................. | G02B 6/4277 439/607.21 |
| 8,162,675 B2* | 4/2012 | Regnier ................ | H01R 13/46 439/76.1 |

(Continued)

*Primary Examiner* — Edwin A. Leon
*Assistant Examiner* — Matthew T Dzierzynski

(57) ABSTRACT

A stacked receptacle connector assembly includes a receptacle cage configured to be mounted to a circuit board, a lower communication connector assembly received in the receptacle cage, and an upper communication connector assembly stacked in the receptacle cage above the lower communication connector assembly. The receptacle cage has a divider between an upper and lower module channels receiving upper and lower pluggable modules. The lower communication connector assembly includes a lower communication connector. The upper communication connector assembly includes a paddle card, an upper communication connector mounted to the paddle card, and a cable assembly having cables electrically connected to the paddle card and extending from the paddle card.

20 Claims, 4 Drawing Sheets

(56) References Cited

U.S. PATENT DOCUMENTS

| | | | | |
|---|---|---|---|---|
| 8,187,019 B2* | 5/2012 | Reed | ............... | H01R 24/60 |
| | | | | 439/345 |
| 8,277,252 B2* | 10/2012 | Fogg | ............... | H01R 13/6587 |
| | | | | 439/607.25 |
| 8,382,509 B2* | 2/2013 | David | ............... | H01R 13/6471 |
| | | | | 439/487 |
| 8,506,319 B2* | 8/2013 | Ritter | ............... | H01R 13/6335 |
| | | | | 439/352 |
| 8,545,268 B2* | 10/2013 | Fogg | ............... | H01R 13/6587 |
| | | | | 439/607.25 |
| 8,684,765 B2* | 4/2014 | Shirk | ............... | H01R 13/7172 |
| | | | | 439/490 |
| 8,864,523 B2* | 10/2014 | Banakis | ............... | H01R 13/6585 |
| | | | | 439/607.25 |
| 8,890,004 B2* | 11/2014 | Wickes | ............... | H05K 9/0009 |
| | | | | 174/382 |
| 9,142,922 B2* | 9/2015 | Regnier | ............... | H01R 12/00 |
| 9,391,407 B1* | 7/2016 | Bucher | ............... | H01R 13/659 |
| 9,413,112 B2* | 8/2016 | Helster | ............... | H01R 12/716 |
| 9,518,785 B2* | 12/2016 | Szczesny | ............... | G02B 6/4261 |
| 9,547,141 B2* | 1/2017 | Wu | ............... | G02B 6/4284 |
| 9,608,377 B1* | 3/2017 | Phillips | ............... | H01R 13/7175 |
| 9,673,570 B2* | 6/2017 | Briant | ............... | H01R 13/6587 |
| 9,871,325 B2* | 1/2018 | Patel | ............... | H01R 13/6473 |
| 9,935,403 B1* | 4/2018 | Briant | ............... | H01R 13/6583 |
| 9,960,553 B2 | 5/2018 | Regnier | ............... | H01R 12/721 |
| 10,104,760 B1* | 10/2018 | Briant | ............... | G02B 6/4284 |
| 10,128,618 B1* | 11/2018 | Briant | ............... | H01R 13/66 |
| 10,797,451 B2* | 10/2020 | Regnier | ............... | H01R 25/006 |
| 2005/0254772 A1* | 11/2005 | Long | ............... | G02B 6/0008 |
| | | | | 385/146 |

* cited by examiner though STACKED RECEPTACLE CONNECTOR ASSEMBLY

BACKGROUND OF THE INVENTION

The subject matter herein relates generally to stacked receptacle connector assemblies.

Some communication systems utilize communication connectors to interconnect various components of the system for data communication. Some known communication systems use pluggable modules, such as I/O modules, that are electrically connected to the communication connector. Conventional communication systems have performance problems, particularly when transmitting at high data rates. Known communication systems provide electrical shielding, such as in the form of a receptacle cage surrounding a communication connector and the pluggable module to provide electrical shielding. However, assembly of such communication systems is problematic. For example, the communication connector typical of a stacked receptacle cage includes two sets of contacts, an upper contact set and a lower contact set, both terminated to the circuit board. The upper contact set mates with the upper pluggable module and the lower contact set mates with the lower pluggable module. However, the upper contact set uses long contacts that are susceptible to damage during termination to the circuit board and experience signal degradation due to the long signal paths. Additionally, the contacts of the upper set are shaped differently than the contacts of the lower set, leading to additional design and manufacturing costs.

A need remains for a communication system that may be assembled in a cost effective and reliable manner.

BRIEF DESCRIPTION OF THE INVENTION

In an embodiment, a stacked receptacle connector assembly is provided including a receptacle cage configured to be mounted to a circuit board, a lower communication connector assembly received in the receptacle cage, and an upper communication connector assembly stacked in the receptacle cage above the lower communication connector assembly. The receptacle cage has walls defining a cavity. The receptacle cage extends between a front and a rear. The receptacle cage has a divider in the cavity between an upper module channel configured to receive an upper pluggable module and a lower module channel configured to receive a lower pluggable module. The lower communication connector assembly includes a lower communication connector The lower communication connector is received in the cavity at the rear aligned with the lower module channel. The lower communication connector has a lower housing having a lower card slot holding lower contacts within the lower card slot for electrical connection with the lower pluggable module. The upper communication connector assembly includes a paddle card, an upper communication connector mounted to the paddle card, and a cable assembly having cables electrically connected to the paddle card and extending from the paddle card. The paddle card is received in the cavity at the rear such that the upper communication connector is aligned with the upper module channel for mating with the upper pluggable module. The upper communication connector has an upper housing having an upper card slot holding upper contacts within the upper card slot for electrical connection with the upper pluggable module. The upper contacts are coupled to the paddle card and the cables extend rearward from the receptacle cage remote from the receptacle cage.

In an embodiment, a stacked receptacle connector assembly is provided including a receptacle cage configured to be mounted to a circuit board, a lower communication connector assembly received in the receptacle cage, and an upper communication connector assembly stacked in the receptacle cage above the lower communication connector assembly. The receptacle cage has walls defining a cavity. The receptacle cage extends between a front and a rear. The receptacle cage has a divider in the cavity between an upper module channel configured to receive an upper pluggable module and a lower module channel configured to receive a lower pluggable module. The lower communication connector assembly includes a lower communication connector. The lower communication connector is received in the cavity at the rear aligned with the lower module channel for mating with the lower pluggable module. The upper communication connector assembly includes an upper communication connector configured to be mounted to a paddle card separate from the circuit board. The upper communication connector is received in the cavity at the rear aligned with the upper module channel for mating with the upper pluggable module. The upper communication connector is identical to the lower communication connector.

In an embodiment, a communication system is provided including a circuit board having a mounting area and a stacked receptacle connector assembly mounted to the mounting area of the circuit board. The stacked receptacle connector assembly includes a receptacle cage, a lower communication connector assembly received in the receptacle cage, and an upper communication connector assembly stacked in the receptacle cage above the lower communication connector assembly. The receptacle cage has walls defining a cavity. The receptacle cage extends between a front and a rear. The receptacle cage includes a top and a bottom. The bottom is mounted to the mounting area of the circuit board. The receptacle cage has a divider in the cavity between an upper module channel configured to receive an upper pluggable module and a lower module channel configured to receive a lower pluggable module. The lower communication connector assembly includes a lower communication connector. The lower communication connector is received in the cavity at the rear aligned with the lower module channel. The lower communication connector has a lower housing having a lower card slot. The lower housing holds lower contacts within the lower card slot for electrical connection with the lower pluggable module. The upper communication connector assembly includes a paddle card separate and discrete from the circuit board, an upper communication connector mounted to the paddle card, and a cable assembly having cables electrically connected to the paddle card and extending from the paddle card. The paddle card is received in the cavity at the rear such that the upper communication connector is aligned with the upper module channel for mating with the upper pluggable module. The upper communication connector has an upper housing having an upper card slot holding upper contacts within the upper card slot for electrical connection with the upper pluggable module. The upper contacts are coupled to the paddle card. The cables extend rearward from the receptacle cage remote from the receptacle cage.

DETAILED DESCRIPTION OF THE INVENTION

Figure 1:
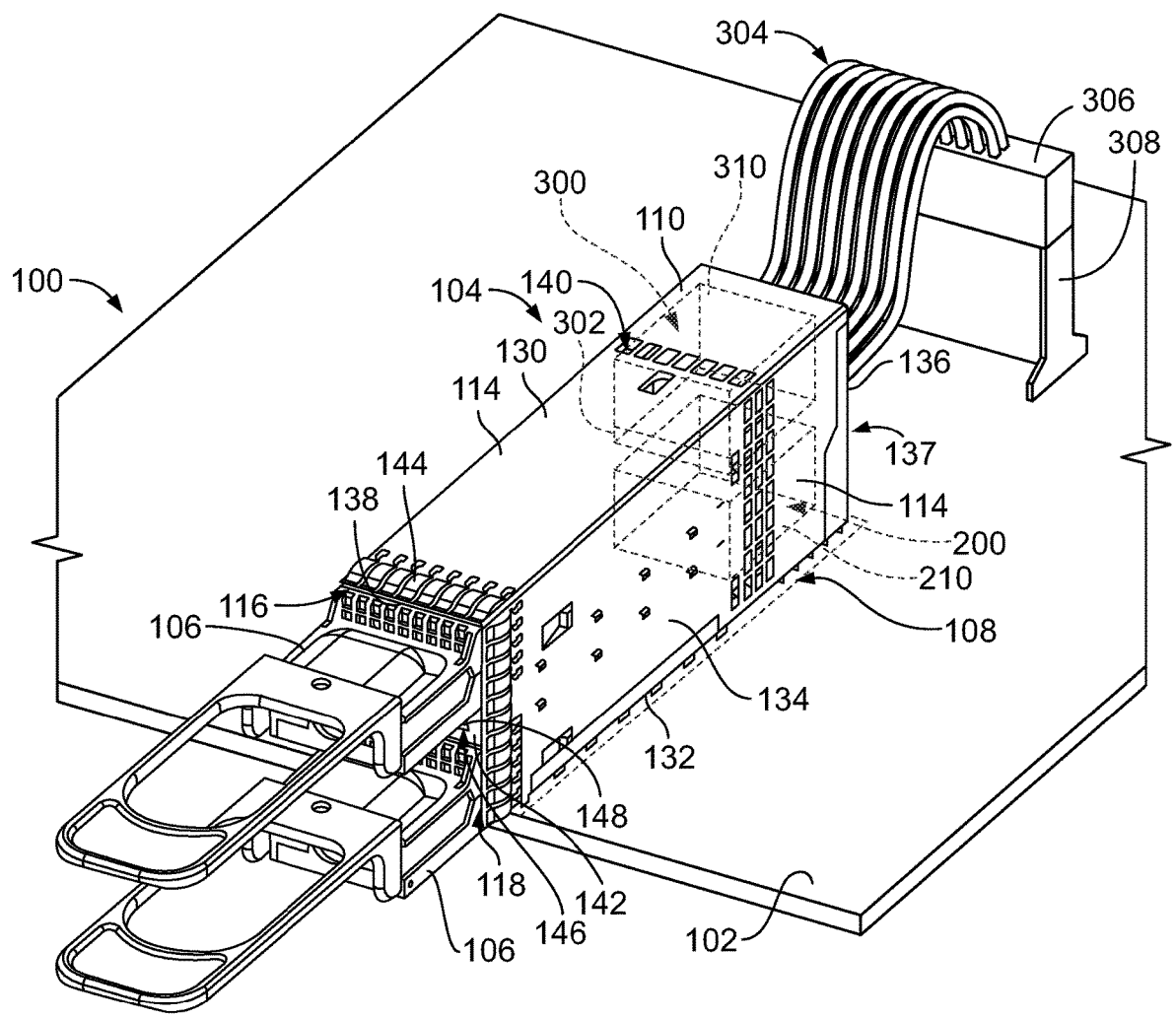
FIG. 1 is a front perspective view of a communication system formed in accordance with an exemplary embodiment.
Figure 2:
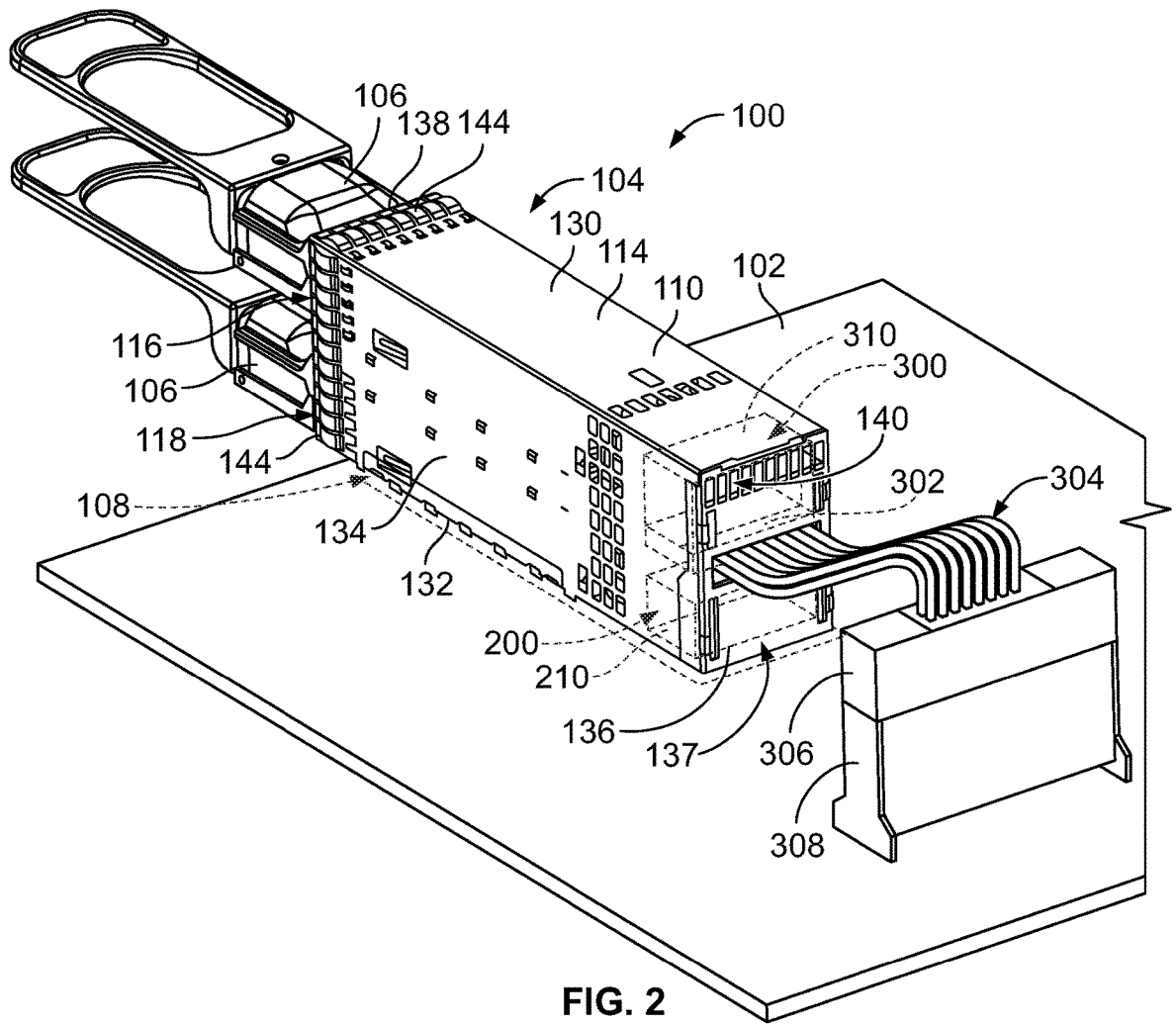
FIG. 2 is a rear perspective view of the communication system formed in accordance with an exemplary embodiment.

FIG. 1 is a front perspective view of a communication system 100 formed in accordance with an exemplary embodiment. FIG. 2 is a rear perspective view of the communication system 100 formed in accordance with an exemplary embodiment. The communication system 100 includes a circuit board 102 and a stacked receptacle connector assembly 104 mounted to the circuit board 102. Pluggable modules 106 are configured to be electrically connected to the stacked receptacle connector assembly 104. The stacked receptacle connector assembly 104 includes a cable assembly 304 configured to be coupled to another electrical component and/or the circuit board 102. The pluggable modules 106 are electrically connected to the circuit board 102 and the cable assembly 304 through the receptacle connector assembly 104.

Figure 4:
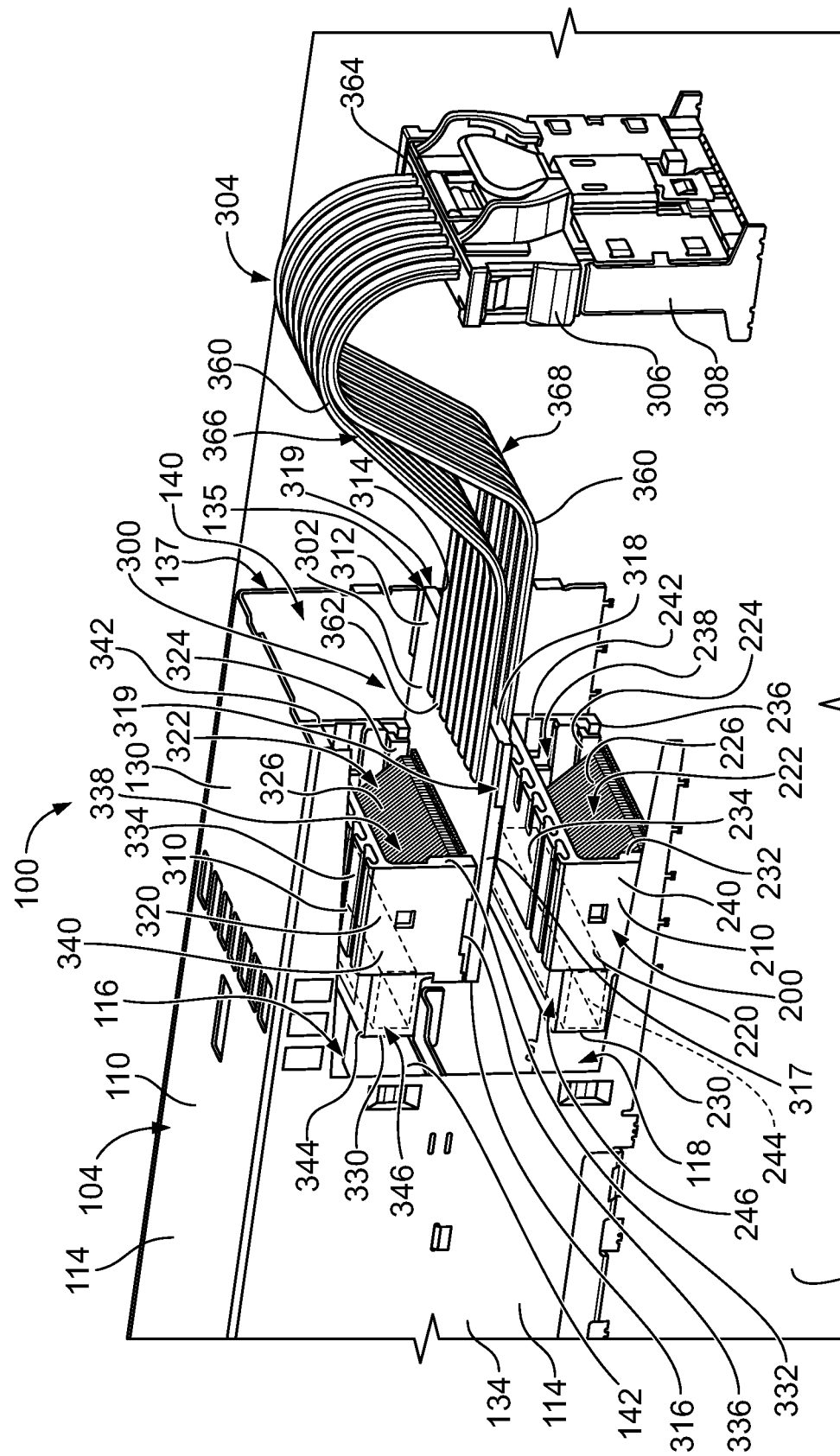
FIG. 4 is a rear perspective, partial sectional view of the communication system showing an upper communication connector assembly in accordance with an exemplary embodiment.

In an exemplary embodiment, the stacked receptacle connector assembly 104 includes a receptacle cage 110, a lower communication connector assembly 200 (also shown in FIG. 4), and an upper communication connector assembly 300 (also shown in FIG. 4). The lower communication connector assembly 200 includes a lower communication connector 210 (also shown in FIG. 4). The upper communication connector assembly 300 includes an upper communication connector 310 (also shown in FIG. 4). In an exemplary embodiment, the upper communication connector assembly 300 includes a paddle card 302, the upper communication connector 310 mounted to the paddle card 302, and the cable assembly 304 electrically connected to the paddle card 302. The upper communication connector 310 is connected to the cable assembly 304 by the paddle card 302. The paddle card 302 includes a substrate, such as a circuit board, used to provide an electrical connection between the cable assembly 304 and the upper communication connector 310. The cable assembly 304 allows electrical connection to another component, or to the circuit board, remote from the receptacle cage 110 via cables rather than through traces on the circuit board 102. The upper communication connector assembly 300 enhances signal integrity performance compared to communication systems that connect an upper communication connector directly to the circuit board by reducing lengths of contacts and circuit board traces.

The lower and upper communication connectors 210, 310 are received in the receptacle cage 110. The receptacle cage 110 encloses and provides electrical shielding for the communication connectors 210, 310. The pluggable modules 106 are loaded into the receptacle cage 110 and are at least partially surrounded by the receptacle cage 110. The receptacle cage 110 includes a plurality of walls 114 that define module channels for receipt of corresponding pluggable modules 106. The walls 114 may be solid sheets, perforated walls to allow airflow therethrough, walls with cutouts, such as for a heatsink or heat spreader to pass therethrough, or walls defined by rails or beams with relatively large openings, such as for airflow therethrough.

In the illustrated embodiment, the receptacle cage 110 constitutes a stacked cage member having an upper module channel 116 and a lower module channel 118. The receptacle cage 110 has module ports that open to the module channels 116, 118 that receive the pluggable modules 106. Any number of module channels may be provided in various embodiments. In the illustrated embodiment, the receptacle cage 110 includes the upper and lower module channels 116, 118 arranged in a single column, however, the receptacle cage 110 may include multiple columns of ganged module channels 116, 118 in alternative embodiments (for example, 2×2, 3×2, 4×2, 4×3, etc.). The receptacle connector assembly 104 is configured to mate with the pluggable modules 106 in both stacked module channels 116, 118.

In an exemplary embodiment, the walls 114 of the receptacle cage 110 include a top wall 130, a bottom wall 132, side walls 134, and a rear wall 136 at a rear 137 of the receptacle cage 110. The bottom wall 132 may rest on the circuit board 102. However, in alternative embodiments, the receptacle cage 110 may be provided without the bottom wall 132. The receptacle cage 110 extends to a front 138 opposite the rear wall 136. The module ports are provided at the front 138. The walls 114 define a cavity 140. For example, the cavity 140 may be defined by the top wall 130, the bottom wall 132, the side walls 134, and the rear wall 136. Other walls 114 may separate or divide the cavity 140 into the various module channels 116, 118. For example, the walls 114 include a divider 142 between the upper and lower module channels 116, 118. The divider 142 forms a space between the upper and lower module channels 116, 118, such as for airflow, for routing light pipes, or for other purposes. In other various embodiments, the walls 114 may include vertical separator panels between ganged module channels 116 and/or 118.

In an exemplary embodiment, the receptacle cage 110 may include one or more gaskets 144 at the front 138 for providing electrical shielding for the module channels 116, 118. For example, the gaskets 144 may be configured to electrically connect with the pluggable modules 106 received in the corresponding module channels 116, 118. The gaskets 144 are configured to engage a panel (not shown) to electrically connect the receptacle cage 110 to the panel.

In an exemplary embodiment, the receptacle connector assembly 104 may include one or more heat sinks (not shown) for dissipating heat from the pluggable modules 106. For example, the heat sink may be coupled to the top wall 130 for engaging the upper pluggable module 106 received in the upper module channel 116. The heat sink may extend through an opening in the top wall 130 to directly engage the pluggable module 106. Other types of heat sinks may be provided in alternative embodiments.

In an exemplary embodiment, the communication connectors 210, 310 are received in the cavity 140, such as proximate to the rear wall 136. The lower communication connector 210 is aligned with the lower module channel 118 and used to electrically connect with the lower pluggable module 106. The upper communication connector 310 is aligned with the upper module channel 116 and used to electrically connect with the upper pluggable module 106.

In an exemplary embodiment, the pluggable modules 106 are loaded into the receptacle cage 110 through the front 138 to mate with the communication connectors 210, 310. The shielding walls 114 of the receptacle cage 110 provide electrical shielding around the communication connectors 210, 310 and the pluggable modules 106, such as around the mating interfaces between the communication connectors 210, 310 and the pluggable modules 106. The lower communication connector 210 is coupled to the circuit board 102. For example, the communication connector 210 may be a surface mount connector surface mounted to the circuit board 102. In alternative embodiments, the communication connector 210 may be press-fit to the circuit board 102. The upper communication connector 310 is coupled to the paddle card 302. For example, the communication connector 310 may be a surface mount connector surface mounted to the paddle card 302. In alternative embodiments, the communication connector 310 may be press-fit to the paddle card 302.

The receptacle cage 110 is mounted to the circuit board 102 at a mounting location 108 over the communication connector 210. The upper communication connector assembly 300 is electrically connected to the circuit board 102 at a remote location, remote from the mounting location 108. For example, the cable assembly 304 extends from the paddle card 302 to an electrical connector 306. The electrical connector 306 is configured to be mated to an electrical connector 308. The electrical connector 308 may be a surface mount connector, such as a card edge connector, and the electrical connector 306 may be a plug connector, such as a paddle card connector. Other types of connectors may be used in alternative embodiments. In other various embodiments, the cable assembly 304 may be terminated directly to the circuit board 102 at the remote location. The cable assembly 304 may be electrically connected to another component rather than the circuit board 102 in alternative embodiments.

Figure 3:
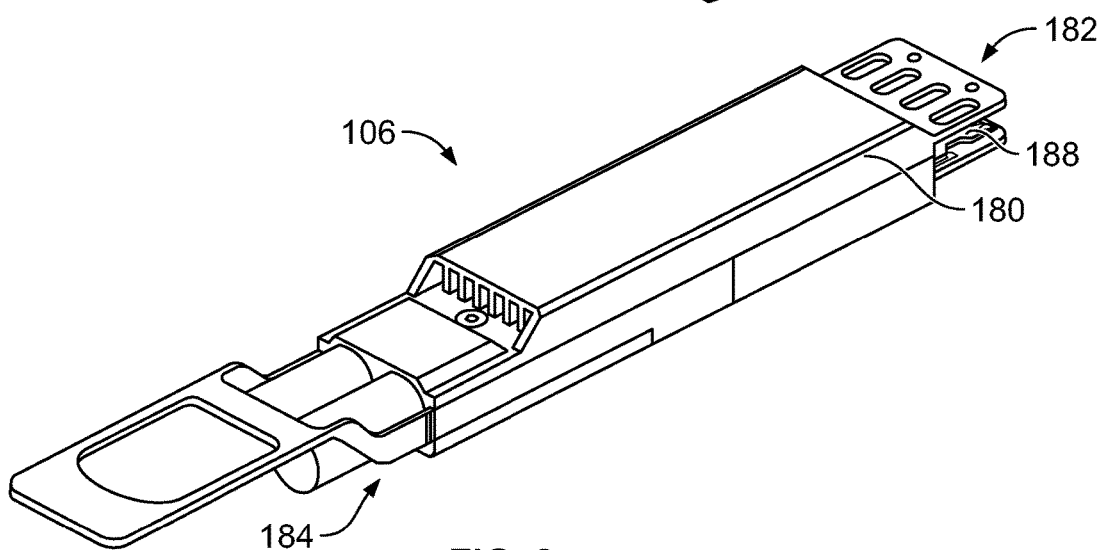
FIG. 3 is a perspective view of a pluggable module of the communication system in accordance with an exemplary embodiment.

FIG. 3 is a perspective view of the pluggable module 106 in accordance with an exemplary embodiment. The pluggable module 106 may be an I/O module, such as a transceiver module. In an exemplary embodiment, the pluggable module 106 has a pluggable body 180, which may be defined by one or more shells. The pluggable body 180 may be thermally conductive and/or may be electrically conductive, such as to provide EMI shielding for the pluggable module 106. The pluggable body 180 includes a mating end 182 at a rear of the pluggable body 180 and an opposite front end 184. The mating end 182 is configured to be inserted into the corresponding module channel 116 or 118 (shown in FIG. 1). The front end 184 may be a cable end having a cable extending therefrom to another component within the system. The pluggable module 106 includes a module circuit board 188 that is configured to be communicatively coupled to the corresponding communication connector 210, 310 (both shown in FIG. 3). The module circuit board 188 may have conductors, traces, pads, electronics, sensors, controllers, switches, inputs, outputs, and the like associated with the module circuit board 188 to form various circuits.

FIG. 4 is a rear perspective, partial sectional view of the communication system 100 in accordance with an exemplary embodiment. FIG. 4 illustrates the stacked receptacle connector assembly 104 including the receptacle cage 110 mounted to the circuit board 102, the lower communication connector assembly 200 received in the receptacle cage 110, and the upper communication connector assembly 300 stacked in the receptacle cage 110 above the lower communication connector assembly 200.

The receptacle cage 110 includes the walls 114 defining the cavity 140. The receptacle cage 110 receives the lower and upper communication connectors 210, 310 in the cavity 140 at the rear 137. The receptacle cage 110 includes the divider 142 in the cavity 140 between the upper module channel 116 and the lower module channel 118.

The lower communication connector assembly 200 includes the lower communication connector 210, which is mounted to the circuit board 102. The lower communication connector 210 includes a housing 220 holding a contact module 222 including a contact holder 224 and contacts 226 held by the contact holder 224. The contact holder 224 is coupled to the housing 220 to position the contacts 226 in the housing 220. The contacts 226 may be arranged in multiple rows within the housing 220, such as an upper row and a lower row (not shown). The contacts 226 in the upper row are configured to engage the traces or pads on upper surface of the module circuit board 188 (shown in FIG. 3) and the contacts 226 in the lower row are configured to engage the traces or pads on the lower surface of the module circuit board 188.

The housing 220 extends between a front 230 and a rear 232. The housing 220 has a top 234 and a bottom 236. The housing 220 has a cavity 238 open at the bottom 236 and/or the rear 232 to receive the contact module 222. The housing 220 includes a first side 240 and a second side 242. In an exemplary embodiment, the housing 220 is manufactured from a dielectric material. For example, the housing 220 may be molded from a plastic material. The housing 220 includes an extension 244 at the front 230 having a card slot 246 (shown in phantom) configured to receive the module circuit board 188. The contacts 226 are arranged in the card slot 246 in an upper row and a lower row for mating with the module circuit board 188 of the pluggable module 106.

The contacts 226 transition between the front 230 and the bottom 236 to electrically connect the pluggable module 106 with the circuit board 102. The contacts 226 transition from the card slot 246 to the bottom 236 for termination to the circuit board 102. In various embodiments, the contacts 226 may be surface mounted to the circuit board 102. For example, the contacts 226 may include solder tails configured to be surface mounted to the circuit board 102. In alternative embodiments, the contacts 226 may include compliant pins configured to be press-fit into the circuit board 102. In an alternative embodiment, rather than terminating directly to the main circuit board 102, the contacts 226 may be terminated to a paddle card, similar to the upper paddle card 302. Other types of communication connectors and contacts may be used in alternative embodiments, such as a cable connector.

The upper communication connector assembly 300 includes the paddle card 302, the upper communication connector 310 mounted to the paddle card 302, and the cable assembly 304. In an exemplary embodiment, the upper communication connector 310 is identical to the lower communication connector 210. For example, both communication connectors 210, 310 are surface mount connectors, such as surface mount card edge connectors.

The paddle card 302 is received in the cavity 140 at the rear 137 of the receptacle cage 110, such as generally aligned with the divider 142. For example, the paddle card 302 may pass through the rear wall 136 (shown in FIG. 2) of the receptacle cage 110. In an exemplary embodiment, the paddle card 302 is located above the lower communication connector 210 and oriented parallel to the circuit board 102. The paddle card 302 includes an upper surface 312 and a lower surface 314. The upper communication connector 310 is mounted to the upper surface 312. The lower surface 314 faces the lower communication connector 210. The paddle card 302 includes a front 316 and a rear 318. The paddle card 302 includes side edges 317 between the front 316 and the rear 318. The side edges 317 may be coupled to the side walls 134. For example, the paddle card 302 may include mounting tabs 319 extending from the side edges 317 that are coupled to the side walls 134, such as being received in slots 135 in the side walls 134 to position the paddle card 302 within the cavity 140. In the illustrated embodiment, the upper communication connector 310 is mounted to the paddle card 302 at the front 316. The cable assembly 304 is electrically connected to the paddle card 302 at the rear 318. In the illustrated embodiment, the paddle card 302 is located below the upper communication connector 310. However, in alternative embodiments, the paddle card 302 is located above the upper communication connector 310, such as mounted to the top wall 130.

The upper communication connector 310 includes a housing 320 holding a contact module 322 including a contact holder 324 and contacts 326 held by the contact holder 324. The contact holder 324 is coupled to the housing 320 to position the contacts 326 in the housing 320. The contacts 326 may be arranged in multiple rows within the housing 320, such as an upper row and a lower row (not shown). The contacts 326 in the upper row are configured to engage the traces or pads on upper surface of the module circuit board 188 (shown in FIG. 3) and the contacts 326 in the lower row are configured to engage the traces or pads on the lower surface of the module circuit board 188.

The housing 320 extends between a front 330 and a rear 332. The housing 320 has a top 334 and a bottom 336. The housing 320 has a cavity 338 open at the bottom 336 and/or the rear 332 to receive the contact module 322. The housing 320 includes a first side 340 and a second side 342. In an exemplary embodiment, the housing 320 is manufactured from a dielectric material. For example, the housing 320 may be molded from a plastic material. The housing 320 includes an extension 344 at the front 330 having a card slot 346 (shown in phantom) configured to receive the module circuit board 188. The contacts 326 are arranged in the card slot 346 in an upper row and a lower row for mating with the module circuit board 188 of the pluggable module 106.

The contacts 326 transition between the front 330 and the bottom 336 to electrically connect the pluggable module 106 with the paddle card 302. The contacts 326 transition from the card slot 346 to the bottom 336 for termination to the paddle card 302. In various embodiments, the contacts 326 may be surface mounted to the paddle card 302. For example, the contacts 326 may include solder tails configured to be surface mounted to the paddle card 302. In alternative embodiments, the contacts 326 may include compliant pins configured to be press-fit into the paddle card 302.

The cable assembly 304 includes cables 360 each extending between a first end 362 and a second end 364. The cables 360 have signal conductors transmitting data between the first end 362 and the second end 364. The cables 360 may be shielded cables. Optionally, the cables 360 may be dual axial cables 360 each have a pair of signal conductors, which may have a cable shield for the pair of signal conductors.

In various embodiments, the cables 360 are terminated directly to the paddle card 302. For example, the cables 360 may be soldered to contact pads on the paddle card 302. The contact pads are terminated to corresponding contacts 326 to electrically connect the cables 360 and the contacts 326 of the upper communication connector 310 via the paddle card 302. The cables 360 may extend through the rear wall 136 into the cavity 140 for termination to the paddle card 302.

Optionally, a portion of the paddle card 302 may extend rearward of the rear wall 136 of the receptacle cage 110 (for example, located outside of the cavity 140). The cable assembly 304 may be electrically connected to the paddle card 302 rearward of the rear wall 136. In alternative embodiments, the cables 360 may be terminated directly to the contacts 326 rather than using the paddle card 302.

In other various embodiments, the cable assembly 304 may include contacts (not shown) terminated to ends of the conductors of the cables 360, such contacts being terminated directly to the paddle card 302. The contacts may include spring beams, solder tails, press-fit compliant beams, and the like. In other various embodiments, the cable assembly 304 may include an electrical connector (not shown) at the first end configured to be electrically connected to the paddle card 302, such as a paddle card connector, a press-fit connector, a surface mount connector, and the like. Optionally, the cables 360 of the cable assembly 304 are arranged in an upper cable set 366 and a lower cable set 368. The cables 360 of the upper cable set 366 are terminated directly to the upper surface 312 of the paddle card 302. The cables 360 of the lower cable set 368 are terminated directly to the lower surface 314 of the paddle card 302.

In an exemplary embodiment, the cable assembly 304 includes the electrical connector 306 at the second end. The cables 360 are terminated to the electrical connector 306. In various embodiments, the electrical connector 306 is a plug connector. The electrical connector 306 is terminated to the mating electrical connector 308 remote from the receptacle cage 110. For example, the mating electrical connector 308 is mounted to the circuit board 102 remote from the receptacle cage 110. The mating electrical connector 308 may be a surface mount connector, such as a card edge connector. In various embodiments, the mating electrical connector 308 is a receptacle connector and the electrical connector 306 is a plug connector. The mating electrical connector 308 may be a component of another electrical component or device rather than being mounted to the circuit board 102. In various embodiments, the cables 360 may be electrically connected to multiple electrical connectors 306.

Figure 5:
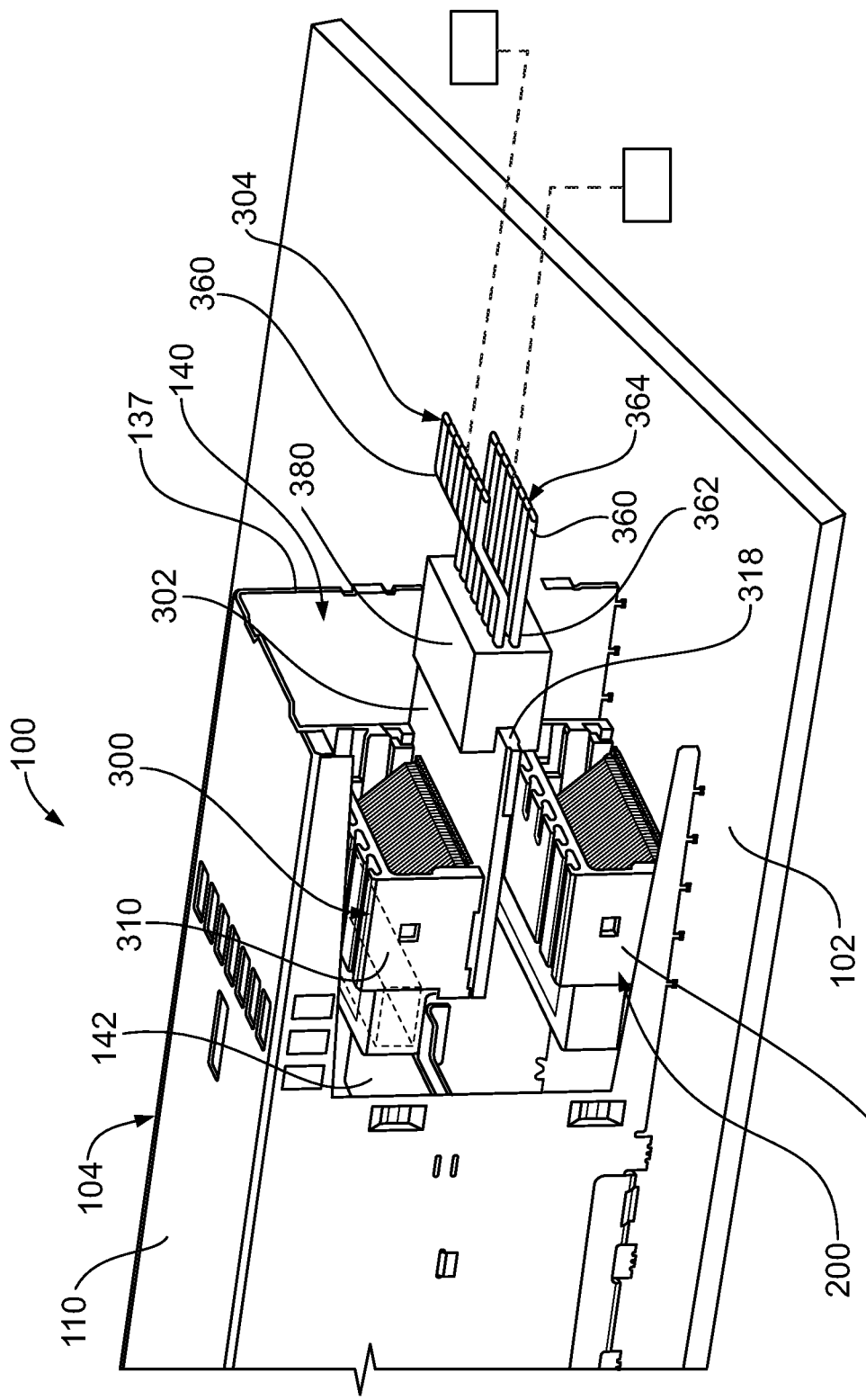
FIG. 5 is a rear perspective, partial sectional view of the communication system in accordance with an exemplary embodiment.

FIG. 5 is a rear perspective, partial sectional view of the communication system 100 in accordance with an exemplary embodiment. FIG. 5 illustrates the stacked receptacle connector assembly 104 with the upper communication connector assembly 300 having an electrical connector 380 at the first end of the cable assembly 304 coupled to the paddle card 302 rather than the cables 360 being terminated directly to the paddle card 302. The stacked receptacle connector assembly 104 includes the receptacle cage 110 mounted to the circuit board 102, the lower communication connector assembly 200 received in the receptacle cage 110 and mounted to the circuit board 102, and the upper communication connector assembly 300 stacked in the receptacle cage 110 above the lower communication connector assembly 200.

The upper communication connector assembly 300 includes the paddle card 302, the upper communication connector 310 mounted to the paddle card 302, and the cable assembly 304 electrically connected to the paddle card 302 by the electrical connector 380. In an exemplary embodiment, the upper communication connector 310 is identical to the lower communication connector 210. The paddle card 302 is received in the cavity 140 at the rear 137 of the receptacle cage 110, such as generally aligned with the divider 142. The electrical connector 380 is coupled to the paddle card 302 at the rear 318. For example, the electrical connector 380 may be a card edge connector coupled to the edge of the paddle card 302 at the rear 318. However, other types of electrical connectors may be used in alternative embodiments, such as a surface mount connector, a press-fit connector, and the like.

The cable assembly 304 includes the cables 360 extending from the electrical connector 380. The first ends 362 of the cables 360 may be terminated to the electrical connector 380, such as to contacts (not shown) of the electrical connector 380. The second ends 364 of the cables 360 extend remote from the electrical connector 380, such as to another electrical connector mounted to the circuit board 102 (for example, the electrical connector 306 shown in FIG. 4), or to another electrical connector separate from the circuit board 102. In other various embodiments, the second ends 364 of the cables 360 may be terminated directly to the circuit board 102, such as being soldered to the circuit board 102. In other various embodiments, contacts (not shown) may be terminated to the second ends 364 of the cables 360.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "second," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A stacked receptacle connector assembly comprising:
a receptacle cage configured to be mounted to a circuit board, the receptacle cage having walls defining a cavity, the receptacle cage extending between a front and a rear, the receptacle cage having a divider in the cavity between an upper module channel configured to receive an upper pluggable module and a lower module channel configured to receive a lower pluggable module;
a lower communication connector assembly received in the receptacle cage, the lower communication connector assembly including a lower communication connector, the lower communication connector is received in the cavity at the rear aligned with the lower module channel, the lower communication connector has a lower housing having a lower card slot, the lower housing holding lower contacts within the lower card slot for electrical connection with the lower pluggable module; and
an upper communication connector assembly stacked in the receptacle cage above the lower communication connector assembly, the upper communication connector assembly including a paddle card, an upper communication connector mounted to the paddle card, and a cable assembly having cables electrically connected to the paddle card and extending from the paddle card, the paddle card being received in the cavity at the rear such that the upper communication connector is aligned with the upper module channel for mating with the upper pluggable module, the upper communication connector having an upper housing having an upper card slot, the upper housing holding upper contacts within the upper card slot for electrical connection with the upper pluggable module, the upper contacts being coupled to the paddle card, the cables extending rearward from the receptacle cage remote from the receptacle cage.

2. The stacked receptacle connector assembly of claim 1, wherein the upper communication connector is identical to the lower communication connector.

3. The stacked receptacle connector assembly of claim 1, wherein the lower communication connector is a surface mount connector mounted to the circuit board and the upper communication connector is a surface mount connector mounted to the paddle card.

4. The stacked receptacle connector assembly of claim 1, wherein the paddle card is received in the cavity at the rear of the receptacle cage.

5. The stacked receptacle connector assembly of claim 1, wherein the paddle card is aligned with the divider of the receptacle cage.

6. The stacked receptacle connector assembly of claim 1, wherein the paddle card is located above the lower communication connector and oriented parallel to the circuit board.

7. The stacked receptacle connector assembly of claim 1, wherein the receptacle cage includes a paddle card support, the paddle card engaging the paddle card support to hold the paddle card in the cavity of the receptacle cage.

8. The stacked receptacle connector assembly of claim 1, wherein the lower communication connector includes a top and a bottom, the bottom of the lower communication connector being mounted to the circuit board, the top of the lower communication connector facing the paddle card, the upper communication connector including a top and a bottom, the bottom of the upper communication connector being mounted to the paddle card, the top of the upper communication connector facing a top wall of the walls of the receptacle cage.

9. The stacked receptacle connector assembly of claim 1, wherein the paddle card includes an upper surface and a lower surface, the upper surface facing the upper communication connector, the lower surface facing the lower communication connector.

10. The stacked receptacle connector assembly of claim 1, wherein the cables are terminated directly to the paddle card.

11. The stacked receptacle connector assembly of claim 1, wherein the cables of the cable assembly are arranged in an upper cable set and a lower cable set, the cables of the upper cable set being terminated directly to an upper surface of the paddle card, the cables of the lower cable set being terminated directly to a lower surface of the paddle card.

12. The stacked receptacle connector assembly of claim 1, wherein the cable assembly includes an electrical connector at an end of the cable assembly remote from the paddle card.

13. The stacked receptacle connector assembly of claim 1, wherein the cable assembly includes an electrical connector at an end of the cable assembly, the electrical connector being mounted to the paddle card with the cables of the cable assembly extending from the electrical connector away from the paddle card.

14. The stacked receptacle connector assembly of claim 1, wherein the paddle card includes mounting tabs, the receptacle cage including slots in the walls receiving the mounting tabs to position the paddle card in the cavity of the receptacle cage.

15. The stacked receptacle connector assembly of claim 1, wherein the paddle card passes through a rear wall of the walls of the receptacle cage, the cable assembly being electrically connected to the paddle card rearward of the rear wall.

16. A stacked receptacle connector assembly comprising:
    a receptacle cage configured to be mounted to a circuit board, the receptacle cage having walls defining a cavity, the receptacle cage extending between a front and a rear, the receptacle cage having a divider in the cavity between an upper module channel configured to receive an upper pluggable module and a lower module channel configured to receive a lower pluggable module;
    a lower communication connector assembly received in the receptacle cage, the lower communication connector assembly including a lower communication connector, the lower communication connector is received in the cavity at the rear aligned with the lower module channel for mating with the lower pluggable module; and
    an upper communication connector assembly stacked in the receptacle cage above the lower communication connector assembly, the upper communication connector assembly including an upper communication connector configured to be mounted to a paddle card separate from the circuit board, the upper communication connector is received in the cavity at the rear aligned with the upper module channel for mating with the upper pluggable module, the upper communication connector being identical to the lower communication connector.

17. The stacked receptacle connector assembly of claim 16, wherein the lower communication connector has a lower housing having a lower card slot, the lower housing holding lower contacts within the lower card slot for electrical connection with the lower pluggable module, the lower contacts being coupled to the circuit board, and wherein the upper communication connector has an upper housing having an upper card slot, the upper housing holding upper contacts within the upper card slot for electrical connection with the upper pluggable module, the upper contacts being coupled to the paddle card.

18. The stacked receptacle connector assembly of claim 16, wherein the upper communication connector assembly includes the paddle card, the upper communication connector mounted to the paddle card, and a cable assembly having cables electrically connected to the paddle card and extending rearward from and remote from the receptacle cage.

19. A communication system comprising:
    a circuit board having a mounting area; and
    a stacked receptacle connector assembly mounted to the mounting area of the circuit board, the stacked receptacle connector assembly comprising a receptacle cage, a lower communication connector assembly received in the receptacle cage, and an upper communication connector assembly stacked in the receptacle cage above the lower communication connector assembly;
    the receptacle cage having walls defining a cavity, the receptacle cage extending between a front and a rear, the receptacle cage including a top and a bottom, the bottom being mounted to the mounting area of the circuit board, the receptacle cage having a divider in the cavity between an upper module channel configured to receive an upper pluggable module and a lower module channel configured to receive a lower pluggable module;
    the lower communication connector assembly includes a lower communication connector mounted to the circuit board at the mounting area, the lower communication connector is received in the cavity at the rear aligned with the lower module channel, the lower communication connector has a lower housing having a lower card slot, the lower housing holding lower contacts within the lower card slot for electrical connection with the lower pluggable module; and
    the upper communication connector assembly includes a paddle card separate and discrete from the circuit board, an upper communication connector mounted to the paddle card, and a cable assembly having cables electrically connected to the paddle card and extending from the paddle card, the paddle card being received in the cavity at the rear such that the upper communication connector is aligned with the upper module channel for mating with the upper pluggable module, the upper communication connector having an upper housing having an upper card slot, the upper housing holding upper contacts within the upper card slot for electrical connection with the upper pluggable module, the upper contacts being coupled to the paddle card, the cables extending rearward from the receptacle cage remote from the receptacle cage.

20. The communication system of claim 19, the cable assembly being electrically connected to the circuit board remote from the mounting area and remote from the receptacle cage.

* * * * *